(12) United States Patent
Tsuchiya et al.

(10) Patent No.: US 8,565,312 B2
(45) Date of Patent: Oct. 22, 2013

(54) IMAGE PROCESSING METHOD AND IMAGE INFORMATION CODING APPARATUS USING THE SAME

(75) Inventors: Toshiharu Tsuchiya, Kanagawa (JP); Toru Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 341 days.

(21) Appl. No.: 12/761,646

(22) Filed: Apr. 16, 2010

(65) Prior Publication Data

US 2010/0272181 A1    Oct. 28, 2010

(30) Foreign Application Priority Data

Apr. 24, 2009    (JP) ................................. P2009-106245

(51) Int. Cl.
*H04B 1/66* (2006.01)
*H04N 7/12* (2006.01)
*H04N 11/02* (2006.01)
*H04N 11/04* (2006.01)

(52) U.S. Cl.
USPC .................................................... 375/240.16

(58) Field of Classification Search
USPC ......................................................... 375/240
See application file for complete search history.

(56) References Cited

U.S. PATENT DOCUMENTS

| | | | | |
|---|---|---|---|---|
| 5,398,143 A * | 3/1995 | Strolle et al. | ............ | 360/48 |
| 5,526,131 A * | 6/1996 | Strolle et al. | ............ | 386/318 |
| 5,574,565 A * | 11/1996 | Strolle et al. | ............ | 386/200 |
| 5,583,580 A * | 12/1996 | Jung | ............ | 348/699 |
| 5,623,313 A * | 4/1997 | Naveen | ............ | 375/240.17 |
| 5,684,538 A * | 11/1997 | Nakaya et al. | ............ | 375/240.17 |
| 5,703,877 A * | 12/1997 | Nuber et al. | ............ | 370/395.64 |
| 5,717,470 A * | 2/1998 | Jung | ............ | 348/699 |
| 5,731,850 A * | 3/1998 | Maturi et al. | ............ | 348/699 |
| 5,731,851 A * | 3/1998 | Jung | ............ | 348/699 |
| 5,742,710 A * | 4/1998 | Hsu et al. | ............ | 382/236 |
| 5,748,247 A * | 5/1998 | Hu | ............ | 375/240.14 |
| 5,754,237 A * | 5/1998 | Jung | ............ | 375/240.14 |
| 5,815,602 A * | 9/1998 | Ueda et al. | ............ | 382/236 |
| 5,838,392 A * | 11/1998 | Chen et al. | ............ | 348/699 |
| 5,926,231 A * | 7/1999 | Jung | ............ | 348/699 |

(Continued)

FOREIGN PATENT DOCUMENTS

| | | |
|---|---|---|
| JP | 2000-175202 | 6/2000 |
| JP | 2006-295528 | 10/2006 |
| JP | 2007 274383 | 10/2007 |
| JP | 2009-71642 | 4/2009 |

OTHER PUBLICATIONS

Hierarchical Estimation of the motion vector field <http://homepages.inf.ed.ac.uk/rbf/CVonline/LOCAL_COPIES/AV0405/ZAMPOGLU/Hierarchicalestimation.html>.*

*Primary Examiner* — Christopher S Kelley
*Assistant Examiner* — Asmamaw G Tarko
(74) *Attorney, Agent, or Firm* — Frommer Lawrence & Haug LLP; William S. Frommer (57) ABSTRACT

An image information coding method for performing a motion vector search based on hierarchical search in an image compression information device adapted to output image compression information. The image information coding method includes the steps of, compressing a plurality of frame images at a predetermined compression ratio to generate a plurality of reduced screens of lower hierarchical levels, searching for a first motion vector using the plurality of reduced screens, switching between search areas in a memory in which the frame images are stored, and searching for a second motion vector using the first motion vector in the switched search area.

15 Claims, 7 Drawing Sheets

(56) References Cited

U.S. PATENT DOCUMENTS

| | | | | |
|---|---|---|---|---|
| 5,963,259 A * | 10/1999 | Nakaya et al. | ............ | 375/240.17 |
| 6,075,875 A * | 6/2000 | Gu | ................ | 382/107 |
| 6,108,378 A * | 8/2000 | Keesen | .................... | 375/240.16 |
| 6,134,271 A * | 10/2000 | Nakaya et al. | ............ | 375/240.17 |
| 6,285,713 B1 * | 9/2001 | Nakaya et al. | ............ | 375/240.17 |
| 6,360,027 B1 * | 3/2002 | Hossack et al. | ............... | 382/294 |
| 6,438,168 B2 * | 8/2002 | Arye | ........................ | 375/240.03 |
| 6,516,033 B2 * | 2/2003 | Nakaya et al. | ............ | 375/240.17 |
| 6,542,548 B2 * | 4/2003 | Nakaya et al. | ............ | 375/240.17 |
| 6,594,397 B1 * | 7/2003 | Hu | ................................ | 382/236 |
| 6,895,048 B2 * | 5/2005 | Boice et al. | .............. | 375/240.02 |
| 6,928,116 B2 * | 8/2005 | Weon | ........................ | 375/240.16 |
| 6,928,117 B2 * | 8/2005 | Nakaya et al. | ............ | 375/240.17 |
| 6,987,866 B2 * | 1/2006 | Hu | ................................ | 382/107 |
| 7,002,587 B2 * | 2/2006 | Kondo et al. | .................. | 345/531 |
| 7,020,201 B2 * | 3/2006 | Luo et al. | .................. | 375/240.16 |
| 7,133,454 B2 * | 11/2006 | Nakaya et al. | ............ | 375/240.17 |
| 7,203,369 B2 * | 4/2007 | Lee et al. | ....................... | 382/236 |
| 7,260,148 B2 * | 8/2007 | Sohm | .................... | 375/240.16 |
| 7,362,808 B2 * | 4/2008 | Kang | ........................ | 375/240.16 |
| 7,420,992 B1 * | 9/2008 | Fang et al. | .................... | 370/477 |
| 7,590,180 B2 * | 9/2009 | Kang | ........................ | 375/240.16 |
| 7,602,851 B2 * | 10/2009 | Lee et al. | .................. | 375/240.25 |
| 7,680,188 B2 * | 3/2010 | Nakaya et al. | ............ | 375/240.16 |
| 7,684,487 B2 * | 3/2010 | Nakaya et al. | ............ | 375/240.16 |
| 7,711,044 B1 * | 5/2010 | Hoang et al. | .................. | 375/240 |
| 7,852,939 B2 * | 12/2010 | Asano | ........................ | 375/240.16 |
| 7,881,376 B2 * | 2/2011 | Iguchi et al. | .................. | 375/240.12 |
| 8,019,000 B2 * | 9/2011 | Suzuki et al. | ............ | 375/240.16 |
| 8,046,214 B2 * | 10/2011 | Mehrotra et al. | .......... | 704/200.1 |
| 8,135,070 B2 * | 3/2012 | Nakaya et al. | ............ | 375/240.16 |
| 8,144,779 B2 * | 3/2012 | Kondo et al. | ............. | 375/240.16 |
| 8,155,195 B2 * | 4/2012 | Regunathan et al. | .... | 375/240.16 |
| 8,175,145 B2 * | 5/2012 | Garcia et al. | .................. | 375/240 |
| 2001/0024473 A1 * | 9/2001 | Nakaya et al. | ............ | 375/240.16 |
| 2002/0009143 A1 * | 1/2002 | Arye | ........................ | 375/240.16 |
| 2002/0064229 A1 * | 5/2002 | Nakaya | ........................ | 375/240.17 |
| 2002/0181745 A1 * | 12/2002 | Hu | ................................ | 382/107 |
| 2003/0103569 A1 * | 6/2003 | Nakaya et al. | ............ | 375/240.16 |
| 2004/0212729 A1 * | 10/2004 | Yamaguchi et al. | ....... | 348/387.1 |
| 2004/0252766 A1 * | 12/2004 | Lee et al. | .................. | 375/240.17 |
| 2004/0258154 A1 * | 12/2004 | Liu et al. | .................. | 375/240.16 |
| 2005/0232356 A1 * | 10/2005 | Gomi et al. | ............. | 375/240.16 |
| 2005/0232361 A1 * | 10/2005 | Nakaya et al. | ............ | 375/240.17 |
| 2006/0203912 A1 * | 9/2006 | Kodama | .................. | 375/240.16 |
| 2006/0256864 A1 * | 11/2006 | Ju | ............................ | 375/240.12 |
| 2007/0002952 A1 * | 1/2007 | Nakaya et al. | ............ | 375/240.17 |
| 2007/0019721 A1 * | 1/2007 | Le Leannec et al. | ....... | 375/240.1 |
| 2008/0025395 A1 * | 1/2008 | Nemiroff et al. | ........ | 375/240.12 |
| 2008/0031335 A1 * | 2/2008 | Inoue | .................... | 375/240.16 |
| 2008/0049838 A1 * | 2/2008 | Nakaya et al. | ............ | 375/240.17 |
| 2008/0049839 A1 * | 2/2008 | Nakaya et al. | ............ | 375/240.17 |
| 2008/0049840 A1 * | 2/2008 | Nakaya et al. | ............ | 375/240.17 |
| 2008/0056370 A1 * | 3/2008 | Nakaya et al. | ............ | 375/240.16 |
| 2008/0298457 A1 * | 12/2008 | Yamanashi et al. | ........... | 375/240 |
| 2010/0014588 A1 * | 1/2010 | Nakazato et al. | ........ | 375/240.16 |
| 2010/0272181 A1 * | 10/2010 | Tsuchiya et al. | .......... | 375/240.16 |
| 2010/0284465 A1 * | 11/2010 | Benzler et al. | ............ | 375/240.16 |
| 2011/0050930 A1 * | 3/2011 | Miyagi et al. | ............... | 348/220.1 |
| 2011/0158320 A1 * | 6/2011 | Zheng et al. | ............ | 375/240.16 |

* cited by examiner

| $C_0$ $C_4$ $C_8$ $C_{12}$ | $C_0'$ $C_4'$ $C_8'$ $C_{12}'$ |
|---|---|
| $C_1$ $C_5$ $C_9$ $C_{13}$ | $C_1'$ $C_5'$ $C_9'$ $C_{13}'$ |
| $C_2$ $C_6$ $C_{10}$ $C_{14}$ | $C_2'$ $C_6'$ $C_{10}'$ $C_{14}'$ |
| $C_3$ $C_7$ $C_{11}$ $C_{15}$ | $C_3'$ $C_7'$ $C_{11}'$ $C_{15}'$ |

FIG. 2B

| $r_0$ | $r_8$ | $r_{16}$ | $r_{24}$ | $r_{32}$ | $r_{40}$ | $r_{48}$ | $r_{56}$ | $r_{64}$ |
|---|---|---|---|---|---|---|---|---|
| $r_1$ | $r_9$ | $r_{17}$ | $r_{25}$ | $r_{33}$ | $r_{41}$ | $r_{49}$ | $r_{57}$ | $r_{65}$ |
| $r_2$ | $r_{10}$ | $r_{18}$ | $r_{26}$ | $r_{34}$ | $r_{42}$ | $r_{50}$ | $r_{58}$ | $r_{66}$ |
| $r_3$ | $r_{11}$ | $r_{19}$ | $r_{27}$ | $r_{35}$ | $r_{43}$ | $r_{51}$ | $r_{59}$ | $r_{67}$ |
| $r_4$ | $r_{12}$ | $r_{20}$ | $r_{28}$ | $r_{36}$ | $r_{44}$ | $r_{52}$ | $r_{60}$ | $r_{68}$ |
| $r_5$ | $r_{13}$ | $r_{21}$ | $r_{29}$ | $r_{37}$ | $r_{45}$ | $r_{53}$ | $r_{61}$ | $r_{69}$ |
| $r_6$ | $r_{14}$ | $r_{22}$ | $r_{30}$ | $r_{38}$ | $r_{46}$ | $r_{54}$ | $r_{62}$ | $r_{70}$ |
| $r_7$ | $r_{15}$ | $r_{23}$ | $r_{31}$ | $r_{39}$ | $r_{47}$ | $r_{55}$ | $r_{63}$ | $r_{71}$ |

FIG. 4B REMAINDERS: ±4

FIG. 4D REMAINDERS: +2, -6

FIG. 4A REMAINDERS: 0

FIG. 4C REMAINDERS: -2, +6

Prior Art

IMAGE PROCESSING METHOD AND IMAGE INFORMATION CODING APPARATUS USING THE SAME

BACKGROUND OF THE INVENTION

1. Field of the Invention

The present invention relates to a moving image information coding apparatus, and more particularly to an image processing method and image information coding apparatus using the same relating to memory access in a motion search device.

2. Description of the Related Art

Image information coding apparatus are available which are compliant with MPEG and other similar schemes. In these schemes, image information is treated as digital information. Image information is compressed through orthogonal transform such as discrete cosine transform and motion compensation by taking advantage of redundancy which is a typical characteristic of image information. This is done to ensure high efficiency in transmission and storage of information.

Moving image coding schemes such as MPEG are predictive coding schemes using motion compensation. As a result, motion vectors must be detected for motion compensation in the coding process. In order to achieve high efficiency in coding, motion vectors must be detected in an as wide search range as possible. However, motion search in a wide range requires an enormous number of computations and enormous amount of data.

Figure 7:
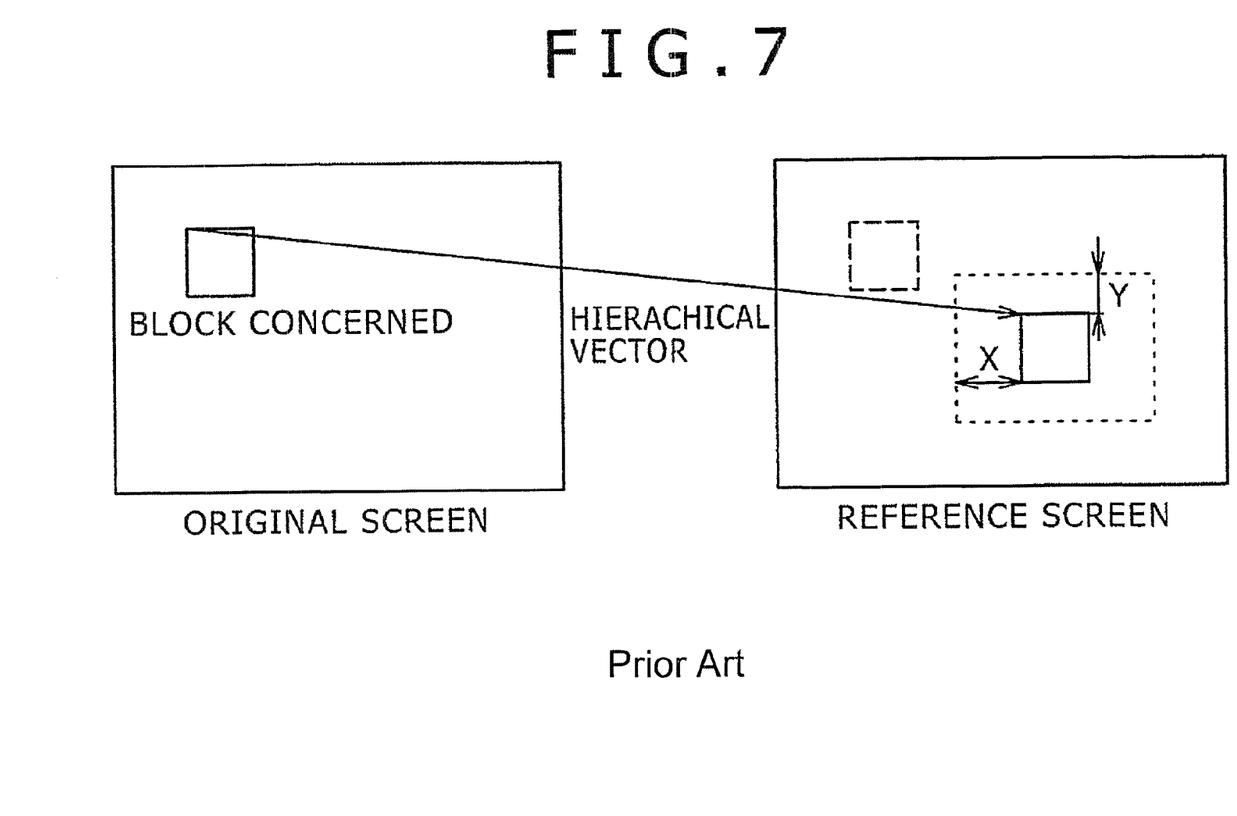
FIG. 7 is a diagram illustrating an example of relationship between the word boundaries and fixed refinement in a common refinement search.

In order to resolve such a problem, a hierarchical motion vector search is conducted. FIG. 7 illustrates an original screen, reference screen and hierarchical vector.

A description will be given below of a hierarchical motion vector search. An input image and reference image are reduced at the same reduction ratio to the same resolution. A coarse motion search is performed using the reduced images. The coarse motion vector obtained here will be hereinafter referred to as a hierarchical vector.

Then, a motion search is performed in a small area around the hierarchical vector in the original image resolution plane (this motion search will be hereinafter written as refinement). It is common to conduct a search in a fixed search area ($\pm X, \pm Y$) appropriate to the capability of the refinement device by transferring reference image data from the frame memory.

Japanese Patent Laid-Open No. 2007-274383 discloses that, during the transfer of the reference image data indicated by the motion vector from the image memory, it is determined whether any part of the reference image lies off the image frame, and that this determination is made in word units.

However, Japanese Patent Laid-Open No. 2007-274383 does not disclose that the search area of the memory is accessed or searched in word units in the refinement using a hierarchical vector.

SUMMARY OF THE INVENTION

In general, a frame memory often includes an SDRAM (Synchronous Dynamic Random Access Memory). However, a frame memory is accessed in word units. Therefore, a refinement search does not necessarily fit properly in the word boundary.

Incidentally, a frame memory is accessed in word units as described above. As a result, some data, although accessed, is not used for the refinement depending on the search area and hierarchical vector value.

Figure 1:
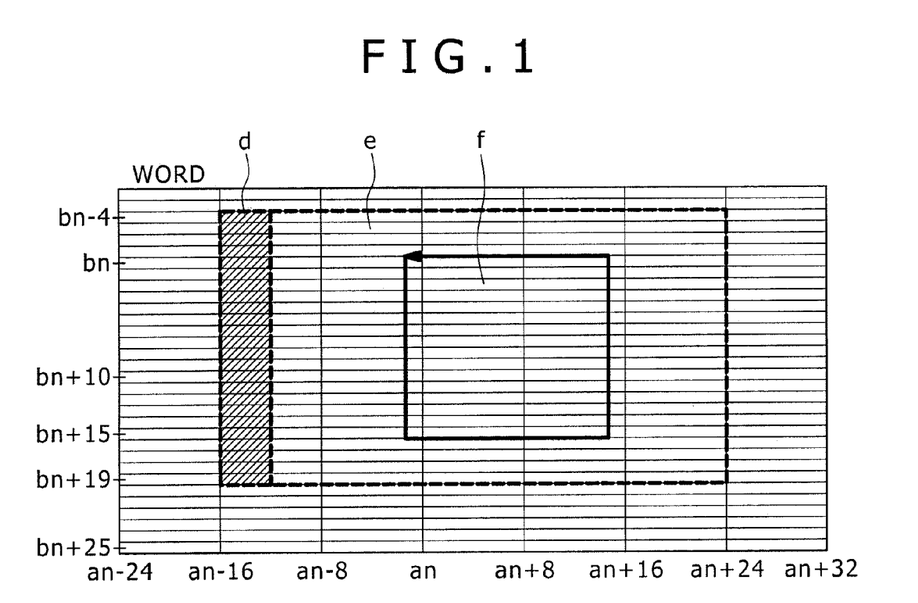
FIG. 1 is a diagram illustrating the relationship between word boundaries and fixed refinement in a refinement search.

For example, FIG. 1 illustrates the relationship between the search area and word mapping when reference data is mapped into the memory, with 8×1 pixels treated as one word and when the hierarchical vector value is (−2, 0) and refinement search area ($\pm 10, \pm 4$) in the original image resolution plane. It should be noted that the filled area in FIG. 1 corresponds to the unused data. So long as the refinement search area is specified by fixed values as in this example, there is always unused data depending on the hierarchical vector value.

It is an embodiment of the present invention to reduce the number of memory accesses in a refinement search for faster motion vector search. It is another embodiment of the present invention to provide improved compression efficiency by switching between search areas.

An image information coding method according to an embodiment of the present invention performs a motion vector search based on hierarchical search in an image compression information device adapted to output image compression information. The image information coding method includes a step of compressing a plurality of frame images at a predetermined compression ratio to generate a plurality of reduced screens of lower hierarchical levels. The image information coding method further includes a step of searching for a first motion vector using the plurality of reduced screens. The image information coding method still further includes a step of switching between search areas in the memory in which the frame images are stored. The image information coding method still further includes a step of searching for a second motion vector using the first motion vector in the switched search area.

In the search for the second motion vector, the search areas should preferably be formed by providing an access unit. When the access unit is a word, access to a word is cancelled according to the proportion of a search target in that word.

Further, in the search for the second motion vector, fine and coarse refinement areas having an arbitrary shape are provided for the accessed image data in the memory with the number of search computations stored.

An image information coding apparatus according to another embodiment of the present invention performs a motion vector search based on hierarchical search in an image compression information device adapted to output image compression information. The image information coding apparatus includes a reduced screen generating device adapted to compress a plurality of frame images at a predetermined compression ratio to generate a plurality of reduced screens of lower hierarchical levels. The image information coding apparatus further includes a first motion prediction device adapted to search for a first motion vector using the plurality of reduced screens. The image information coding apparatus still further includes a second motion prediction device adapted to switch between search areas in the memory in which the frame images are stored to search for a second motion vector using the first motion vector in the switched search area.

The present invention switches between refinement search areas according to the motion vector value in a reduced screen, thus providing faster refinement search for motion vector value and reduced number of memory accesses. The present invention also permits use of all data accessed during switching between refinement search areas, thus providing improved compression efficiency.

DETAILED DESCRIPTION OF THE PREFERRED EMBODIMENTS

A description will be given below of embodiments of the present invention. It should be noted that the description will be given in the following order:
1. First embodiment (first refinement search method)
2. Second embodiment (second refinement search method)
3. Third embodiment (image information coding apparatus using a refinement device)

1. First Embodiment

[First Refinement Search Method]

A description will be given below of a refinement search method which is a first embodiment of the present invention. Here, the term "refinement search" refers to a fine motion vector search using a hierarchical vector. It should be noted that the hierarchical vector is also called a coarse motion vector.

For example, a coarse motion vector is found in a reduced screen by block matching. Then, a refinement search is performed in the original image resolution plane using the coarse motion vector.

Block matching used to find a coarse motion vector in a reduced screen will be described first, followed by the description of a refinement search.

[Coarse Motion Vector Search]

An example of hierarchical search will be given next.

Using image data containing reduced input and reference images, the identified image block on the reduced image plane is shifted one pixel at a time to find the absolute difference. This step is repeated to find a vector from the smallest sum of absolute differences.

When the reference frame (image) is divided into m×n blocks, the blocks arranged in the column direction are denoted respectively as (0,0), (0,1), - - -, (0,m−1), (1,0), (1,1), - - -, (1,m−1), - - -, (n−1,0), (n−1,1), - - -, and (n−1,m−1). It should be noted that each block includes, for example, 4×4 pixels.

Figure 2A:
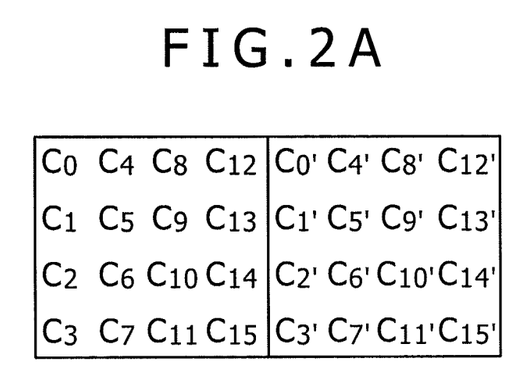
FIGS. 2A and 2B are diagrams for describing block matching used to search for hierarchical vectors.
Figure 2B:
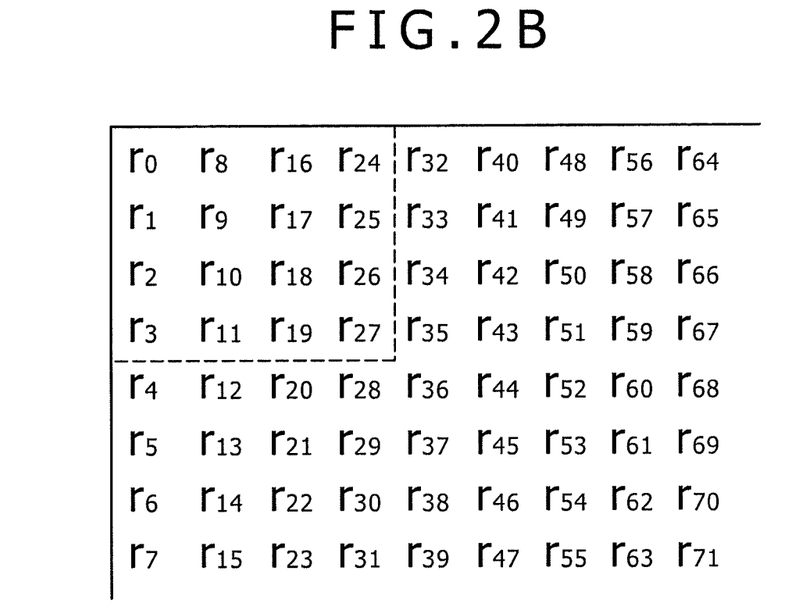

In FIG. 2, the pixel numbers of the image blocks of the reference screen are r0, r1, r2 and so on, whereas those of the original screen are c0, c1, c2 and so on. It should be noted, however, that the block numbers are written in a matrix notation in the equations as r(i, j) and c(i, j). In the reference screen, on the other hand, the image block (n,m) and its surrounding area are, for example, searched. As described above, the reduced reference and original screens are produced by thinning out the numbers of image blocks thereof to 1/N (N: positive integer).

Taking for example a case in which the search area in a hierarchical search is 0≤x≤+3, 0≤y≤+3, a sum of absolute differences Sum(x,y) of each pixel can be found by the following equation:

[Equation 1]

$$\text{Sum}(x,y) = \Sigma_{i=0,3} \Sigma_{j=0,3} \{\text{abs}(r_{i,j} - c_{i,j})\} \quad (1)$$

Using the above equation, the sum of absolute differences at the search position (x,y) can be found. Here, abs{ } denotes the absolute value of { }.

The motion vector of the base (unit of hierarchical search) block can be found by Equation 2 below.

[Equation 2]

$$MV_{x,y} = \min \text{Sum}(x,y) \quad (2)$$

where the right-hand term of Equation 2 represents (x,y) when the sum of absolute differences Sum(x,y) is smallest.

First, $\text{Sum}_{0,0}$, $\text{Sum}_{0,1}$, $\text{Sum}_{0,2}$, $\text{Sum}_{0,3}$, $\text{Sum}_{1,0}$, $\text{Sum}_{1,1}$, $\text{Sum}_{1,2}$, $\text{Sum}_{1,3}$, - - -, $\text{Sum}_{3,0}$, $\text{Sum}_{3,1}$, $\text{Sum}_{3,2}$, and $\text{Sum}_{3,3}$ are found using Equation 1.

More specifically, in FIGS. 2A and 2B, calculation examples of each Sum(x,y) of the block containing the pixel numbers c0 through c15 are as follows:

[Equation 3]

$$\text{Sum}(0,0) = |r0-c0| + |r1-c1| + |r2-c2| + |r3-c3| + |r8-c4| + \text{- - -} + |r27-c15| \quad (3)$$

[Equation 4]

$$\text{Sum}(0,1) = |r1-c0| + |r2-c1| + |r3-c2| + |r4-c3| + |r9-c4| + \text{- - - -} + |r28-c15| \quad (4)$$

[Equation 5]

$$\text{Sum}(3,3) = |r27-c0| + |r28-c1| + |r29-c2| + |r30-c3| + |r35-c4| + \text{- - -} + |r54-c15| \quad (5)$$

Next, the sums of absolute differences Sumx,y(0≤x≤3, 0≤y≤3), found by Equations 3 to 5, are substituted into Equation 2 to find a coarse motion vector $MV_{x,y}$ from the smallest of all the sums according to the definition.

For example, if Sum(2,3) is the smallest of all the sums from Sum(0,0) to Sum(3,3), then the coarse motion vector $VM_{x,y}$ is $VM_{2,3}$.

Next, the same process as used for the image blocks of the reference screen is repeated for the block containing the pixel numbers c0' through c15' to find a motion vector.

Using this process, a search is performed for a coarse motion vector for each of the m×n blocks, i.e., (0, 0) through (n−1,m−1), in the frame.

[Description of the Refinement]

A description will be given next of the refinement in the original image resolution plane using the hierarchical vector (coarse motion vector) $MV_{x,y}$ found in a reduced screen.

Then, a description will be given of the address arrangement in a memory adapted to store the reference screen data. FIGS. 3A to 3D illustrate examples of two-dimensional mapping of the memory addresses. The memory generally includes a semiconductor storage device such as SDRAM (Static Dynamic Random Access Memory) and DRAM.

FIGS. 3A to 3D illustrate examples of mapping of the reference screen data in a refinement search with each word containing 8×1 pixels.

In the memory map, the word unit boundaries are shown by vertical lines, with each enclosed area representing one word unit containing 8×1 pixels. The area enclosed by thick dashed lines is a search area 'e,' and the area enclosed by solid lines an image block (area) 'f' of the search center.

FIGS. 3A to 3D illustrate the relationship between the word boundaries and refinement search area when words are arranged in the memory in units of 8×1 pixels (also referred to as word units) and when the refinement search area is (±10, ±4) with respect to the image block 'f.'

FIGS. 3A to 3D show examples in which the mapped memory addresses are indicated by coordinates to facilitate the visual understanding thereof. In the memory maps, the X coordinates range from 'an−24' to 'an+31,' and the Y coordinates from 'bn−6' to 'bn+25.' Further, the memory addresses are assigned coordinates (an−24,bn−6) through (an+31,bn+25), with vertical lines provided in the X coordinate direction to represent the 8×1 pixel boundaries for ease of viewing. In these examples, the access unit in the X direction is 8×1 pixels. However, the present embodiment is not limited to this unit, and the access unit in the X direction may be the number of pixels stored in one word such as 4×2 pixels.

In the memory maps shown in FIGS. 3A to 3D, the areas other than that subject to the refinement search are denoted by reference numerals 'd' and 'h.' The same reference numerals will be hereinafter assigned to like areas.

As illustrated in FIG. 3, the memory has four different patterns in the original image resolution plane depending on the hierarchical vector value (coarse motion vector) in the X direction according to the address position of the image area 'f.' The following describes the reason for this:

How to calculate the "remainder of the X coordinate address" of the memory in FIGS. 3A to 3D is described below.

Figure 3A:
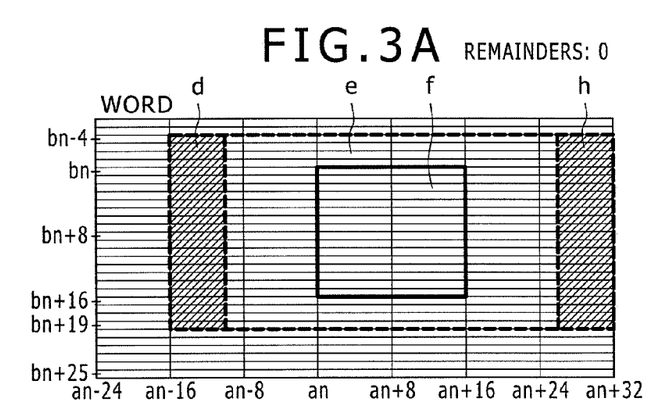
FIGS. 3A to 3D are diagrams illustrating examples of search areas in the memory in a refinement search.

In FIG. 3A, the search area 'e' ranges from (an−10,bn−4) to (an+25,bn+19). Because the X coordinate start address of the image area 'f' is 'an' and fits in the 8×1 pixel unit. Therefore, there is no "remainder."

Figure 3B:
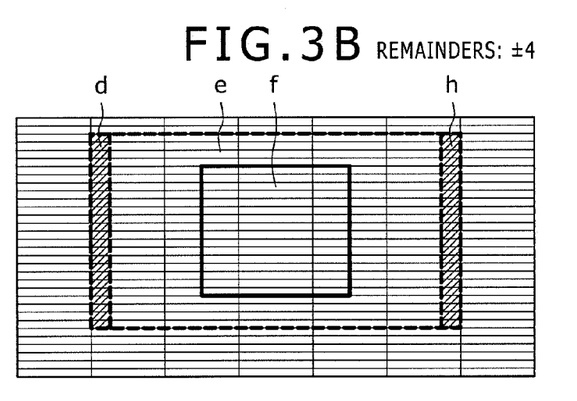

In FIG. 3B, the search area 'e' ranges from (an−10,bn−4) to (an+21,bn+19). On the other hand, the image area 'f,' enclosed by solid lines, ranges from (an−4,bn) to (an+11,bn+15).

In FIG. 3B, the addresses of the image area 'f' are (an−4,bn), (an−4,bn+1), - - - , (an−4,bn+1), (an−3,bn+1), - - - , and (an+11,bn+15). If the X coordinate start address 'an−4' is divided by the 8×1 pixel unit, the "remainder" is +4 when the X coordinate reference address is 'an−8.' On the other hand, if the reference address is 'an,' the "remainder" is −4. These results are shown under FIG. 3B.

Figure 3C:
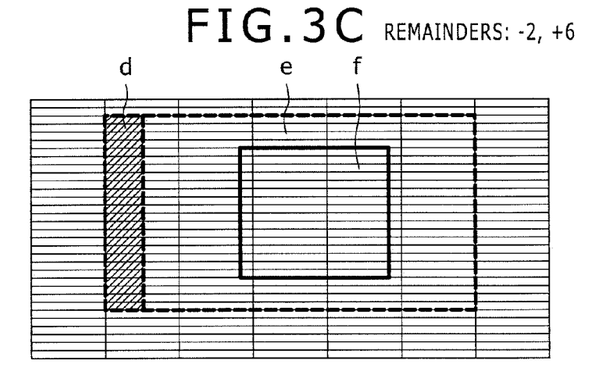

Similarly, in FIG. 3C, the addresses of the image area 'f' are (an−2,bn), (an−1,bn), - - - , (an−1,bn+1), - - - , and (an+13,bn+15). If the X coordinate reference address is 'an−8,' the "remainder" is +6. On the other hand, if the reference address is 'an,' the "remainder" is −2. These results are shown under FIG. 3C.

Figure 3D:
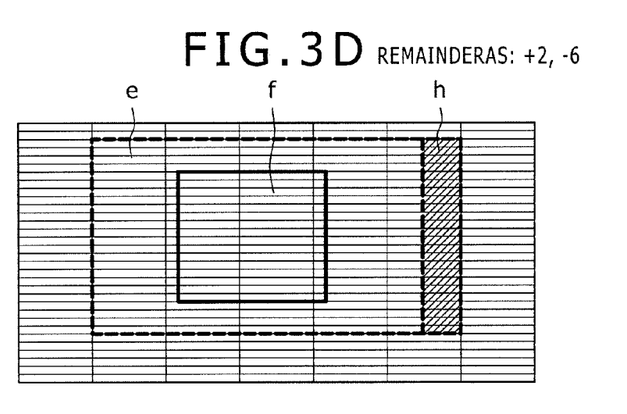

Similarly, in FIG. 3D, if the X coordinate reference address is 'an+8,' the "remainder" is +2. On the other hand, if the reference address is 'an+16,' the "remainder" is −6. These results are shown under FIG. 3D.

From the above, when the memory is accessed in units of 8×1 pixels, the "remainder" of the address with respect to the image block 'f' can be classified into four patterns. These four patterns assume that the reduction ratio for motion search is ½. In the above examples, therefore, the "remainder" takes on the values of 0, ±2, ±4 and ±6.

[Memory Access Method]

A description will be given next of the memory search method in the refinement with reference to FIGS. 3A to 3D.

In FIG. 3A, the addresses of the image area 'f' range from (an,bn) to (an+15,bn+15). If the search area 'e' is larger than the image area 'f' by ±10 in the X direction and ±4 in the Y direction, the addresses of the search area 'e' range from (an−10,bn−4) to (an+25,bn+19).

However, if the memory is accessed in word units by un unshown control device, the X coordinate addresses are 'an−16,' 'an−8,' 'an,' - - - , 'an+32' and so on.

Because the search area 'e' is larger than the image area 'f' by ±10 in the X direction and ±4 in the Y direction, there may be a "remainder" relative to the address position of the image area 'f' depending on the start address of the search area 'e' in the X direction.

In the case of FIG. 3A, the area 'd' ranging from (an−16,bn−4) to (an−11,bn+19) and an area 'h' ranging from (an+26,bn−4) to (an+31,bn+19) are accessed.

During the refinement, however, the filled areas 'd' and 'h' need not be searched. Therefore, even the areas which will not be searched are accessed.

For this reason, the first embodiment of the present invention cancels access if the effective search area is small at the boundary between 8×1 pixel units (word units).

In FIG. 3A, the memory addresses to be searched are set, for example, to be (an−8,bn−4) to (an+23,bn+19). As a result, the search area 'e' is smaller than the common one. That is, an area ranging from (an−16,bn−4) to (an−9,bn+19) and another area ranging from (an+24,bn−4) to (an+31,bn+19) are not searched.

In addition to the above, the X coordinates of the memory map in the search area may be changed in units of 8×1 pixels although this is a tradeoff with the compression efficiency. For example, the search area may range from (an−8,bn−4) to (an+31,bn+19) or (an−16,bn−4) to (an+23,bn+19).

To set the search area, it is not enough to simply reduce the area size. If the refinement search area is smaller than the one prescribed, the compression performance will decline.

If the area to be searched is small as that from 'an−10' to 'an−9' in the X direction for the fixed refinement, cancelling the data access to the addresses from 'an+16' to 'an+9' provides not only reduced power consumption required for memory access but also faster refinement.

FIG. 3B illustrates a case in which the address positions of the image area 'f' are different. The memory access is performed in the same manner as in FIG. 3A. The search area of the past 'e' ranges from (an−14,bn−4) to (an+21,bn+19). As described above, however, if the memory is searched in units of 8×1 pixels, the memory search area 'e' may be changed to range from (an−8,bn−4) to (an+23,bn+19). In addition to the above, the search area 'e' can be set to various ranges, such as between (an−8,bn−4) and (an+15,bn+19) and between (an−16,bn−4) and (an+15,bn+19). Alternatively, the search area of the past may be left unchanged because the fixed search area accounts for a large proportion per access. This range should be selected according to the processing time, the direction of the hierarchical motion vector and so on.

Similarly, in FIGS. 3C and 3D, the memory is searched in word units.

In the case of FIG. 3C, the X coordinate end address of the search area 'e' is 'an+23,' which is an integer multiple of the 8×1 pixel unit. However, the start address of the search area 'e' does not fit in the word unit. Therefore, only the area whose X coordinate address is 'an−8' or less is not searched.

In FIG. 3D, on the other hand, the X coordinate start address of the search area 'e' is 'an−16,' which is an integer multiple of the 8×1 pixel unit. However, the end address of the search area 'e' does not fit in the 8×1 pixel unit. Therefore, the area whose X coordinate address is 'an+16' or more is not searched.

Thus, searching the memory in units of 8×1 pixels during the refinement using a hierarchical vector provides reduced power consumption thanks to reduced number of memory accesses and permits motion search in a short period of time.

As described above, in a refinement search conducted in a fixed search area, the present embodiment cancels access to a word string according to the proportion of the search target pixels in the word.

Therefore, switching between refinement search areas according to the coarse motion search vector value in a reduced screen provides faster motion vector search in the refinement and reduced number of memory accesses.

Second Embodiment

[Second Refinement Search Method]

A description will be given next of a second embodiment of the present invention with reference to the accompanying drawings.

The first embodiment described above is an approach designed to cancel search to the word string concerned according to the proportion of the effective pixels in the word in the fixed refinement search area. In contrast to the first embodiment, however, the second embodiment of the present invention accesses the areas which will not be searched, but effectively uses the obtained data. In other words, the second embodiment searches all the areas including the filled ones in FIG. 3.

During non-real-time operation, there is more leeway in terms of time than during real-time operation. Therefore, it is only necessary to search all the areas. However, it is common that real-time operation is dependent on the refinement capability and the size of the search area. If the assumption is that the search area 'e,' which is larger than the image area 'f' by ($\pm 10, \pm 4$), can guarantee real-time operation as refinement search capability, then real-time operation cannot be guaranteed when there is no remainder ("Remainder: 0") in FIG. 4A with the search area 'e' being larger the image area 'f' by ($\pm 16, \pm 4$).

In order to solve this problem, the number of search points is selected in the following manner according to the area to be searched so as to provide improved search efficiency.

FIGS. 4A to 4D illustrate the search points when the search unit is a macroblock. Depending on the value of the hierarchical vector (corresponding to the coarse motion vector), the areas far from the search center are coarsely searched, whereas those near the search center are finely searched. It should be noted that the search center is located, for example, at the coordinates (an,bn) of the memory map.

FIGS. 4A to 4D show that the search points are searched in a discrete manner. The filled points are not searched, thus reducing the number of points searched.

Figure 4A:
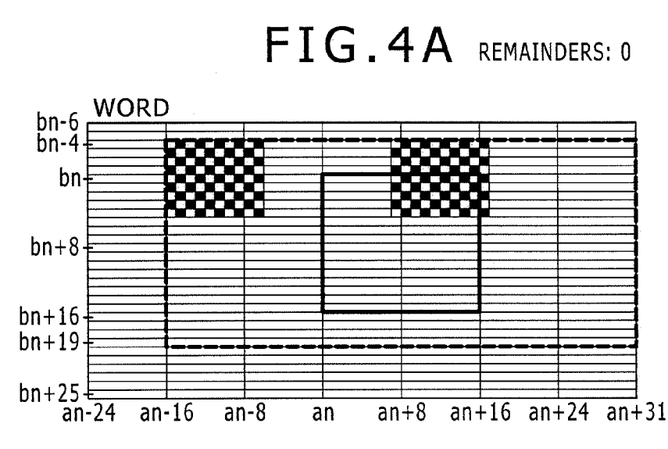
FIGS. 4A to 4D are diagrams illustrating search points in the memory in a refinement search.

A description will be given below of the operation using search points with reference to the memory map with no remainder ("Remainder: 0") shown in FIG. 4A.

The area containing the points to be searched in a discrete manner relative to the refinement center (=(an,bn)) ranges from −16 (an−16) to −7 (an−7) in the X (coordinate) direction. More specifically, in the memory map shown in FIG. 4A, a search is performed in a discrete manner on the points (an−16,bn−4), (an−14,bn−4), (an−12,bn−4), - - - , (an−16,bn+4), - - - , and (an−8,bn+4).

Similarly, the area ranging from +7 (an+7) to +16 (an+16) in the X (coordinate) direction is searched. A search is performed in a discrete manner on the points (an+7,bn−4), (an+9,bn−4), - - - , (an+7,bn+4), - - - , and (an+15,bn+4).

These areas are far from the search center ((an,bn)=(0,0)) indicated by the hierarchical vector. In the area other than the above which ranges from (an−6,bn−4) to (an+6,bn+4), all the points are searched.

Figure 4B:
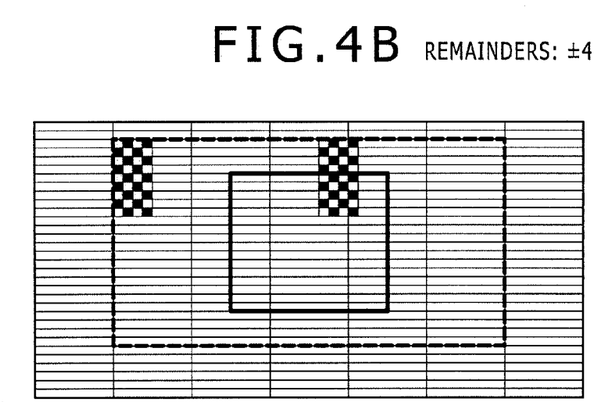

In the memory map shown in FIG. 4B, an area ranging from (an−16,bn−4) to (an−13,bn+4) and another area ranging from (an+5,bn−4) to (an+8,bn+4) are searched in a discrete manner. On the other hand, in the area other than the above which ranges from (an−12,bn−4) to (an+4,bn+4), all the points are searched.

Figure 4C:
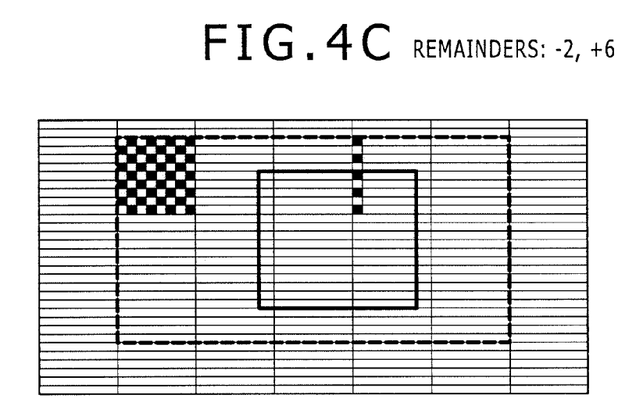
Figure 4D:
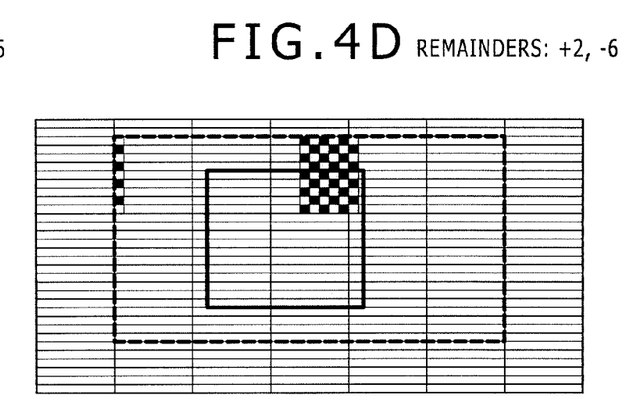

In FIGS. 4C and 4D, a search is performed in the same manner as described above.

The search method shown in FIG. 4 is merely an example. As long as the number of search points is stored, the search area, in principle, can take any shape.

Figure 5A:
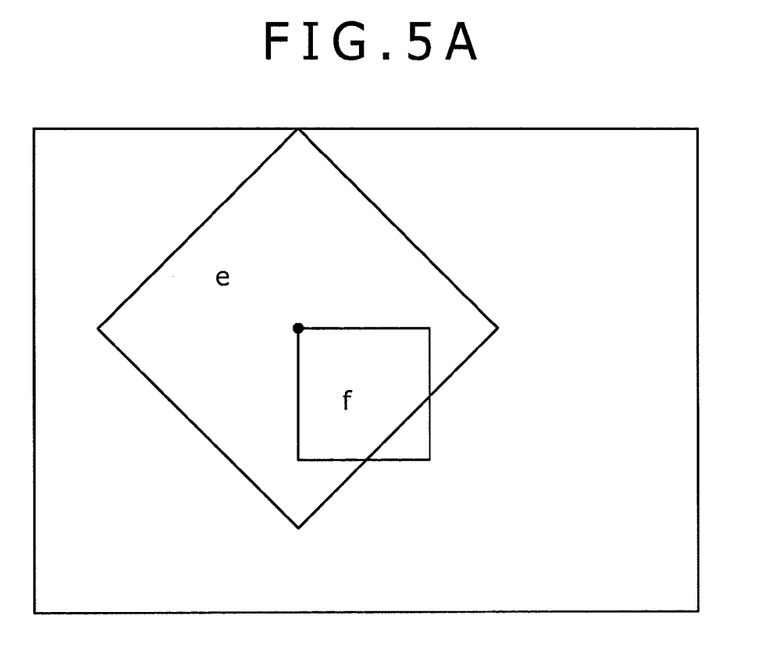
FIGS. 5A and 5B are diagrams illustrating search points for other search shape in a refinement search.

As illustrated in FIG. 5A, for example, the search area 'e' may be rhombic in which the distance between the search center (an,bn) and each of the hierarchical vectors is the same. All the points within this rhombic area are searched. Outside this area, on the other hand, every other points are searched. In addition to this, every three points (or even every four or more points) outside the rhombic area may be searched in a discrete manner.

Figure 5B:
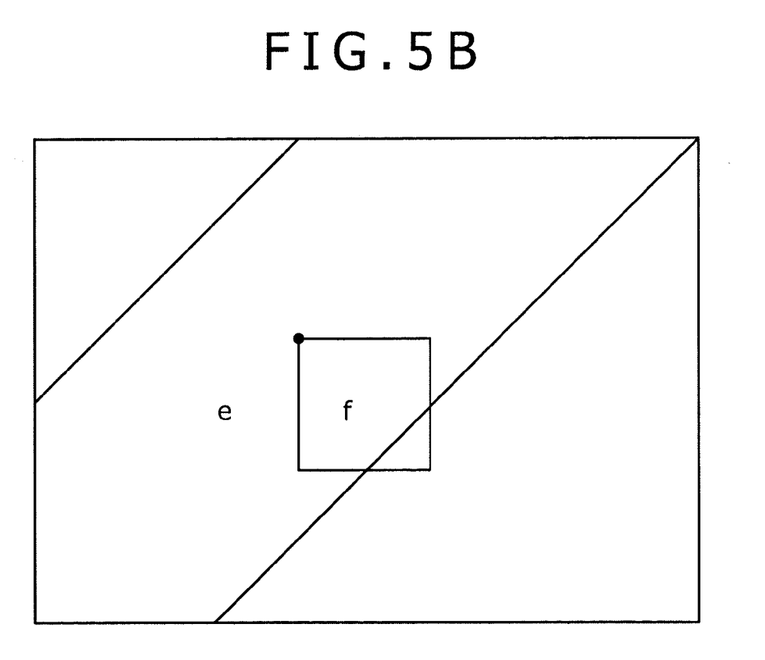

Further, as an example of other shapes, the search area may be pentagonal. Outside the search area, a coarse search is performed at intervals of a predetermined number of pixels. Inside the search area, on the other hand, all the pixels are searched.

Thus, the present invention performs a fine search inside the specified area according to the magnitude of the hierarchical vector (coarse motion vector) and a coarse search at intervals outside the specified area. It should be noted that the search area is not limited to the above shapes. The search area may take any shape so long as it can classify the entire area into two parts. Therefore, the area may be, for example, polygonal, circular or elliptical.

As described above, the present invention switches between refinement search areas in an image compression information coding device adapted to output image compression information according to the value of the coarse motion search vector in a reduced screen, thus ensuring effective use of accessed data and providing improved compression efficiency.

Third Embodiment

[Configuration of the Image Processing Device]

A description will be given next of an image information coding apparatus 100 using refinement search.

Figure 6:
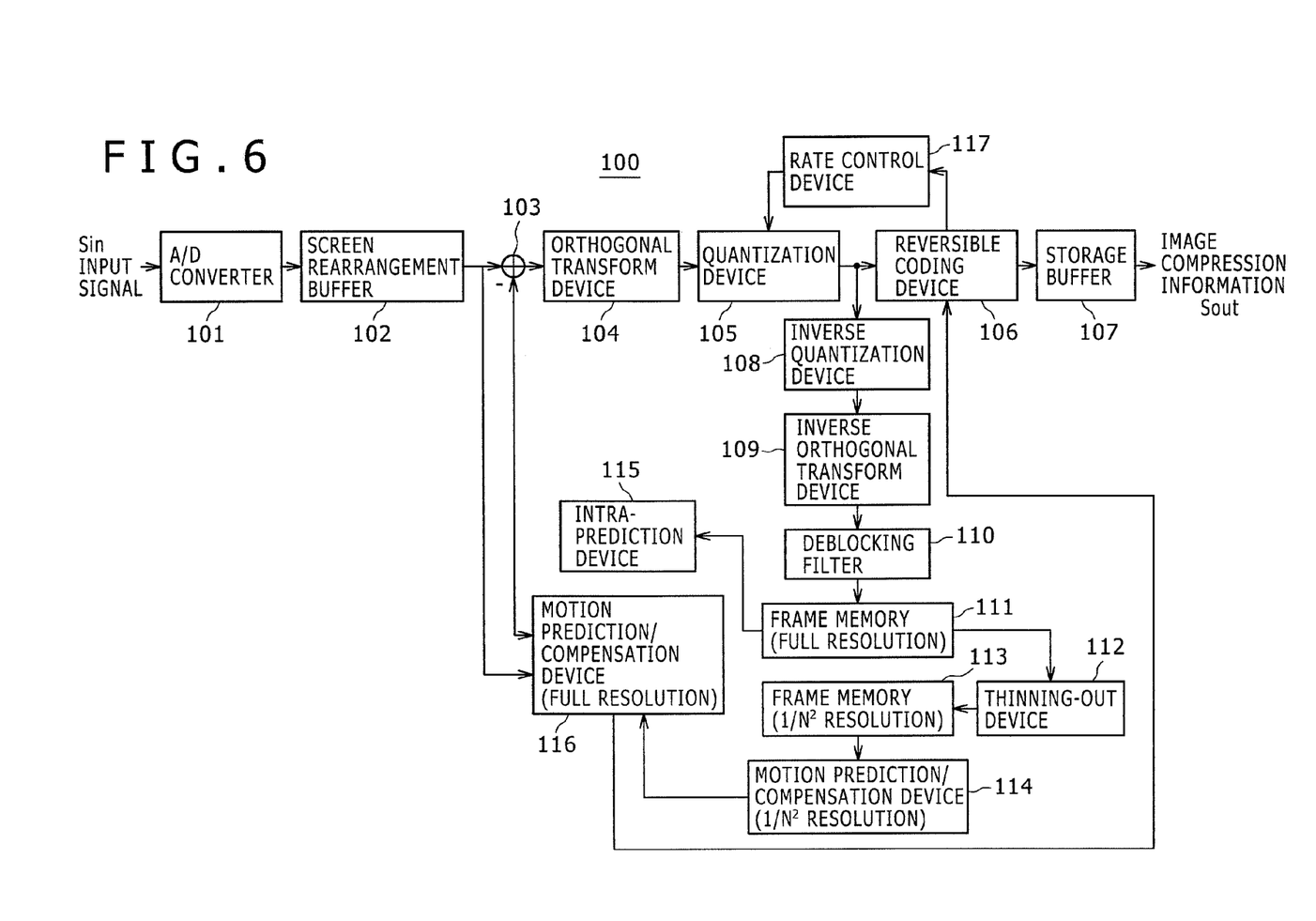
FIG. 6 is a diagram illustrating the block configuration of an image information coding apparatus using hierarchical vector search.

As illustrated in FIG. 6, the image information coding apparatus 100 includes an A/D (analog/digital) converter 101, screen rearrangement buffer 102, adder 103, orthogonal transform device 104, quantization device 105, reversible coding device 106, storage buffer 107, inverse quantization device 108, inverse orthogonal transform device 109, deblocking filter 110, frame memory (full resolution) 111, thinning-out device 112, frame memory ($1/N^2$ resolution) 113, motion prediction/compensation device ($1/N^2$ resolution) 114, intra-prediction device 115, motion prediction/compensation device (full resolution) 116 and rate control device 117.

[Description of the Operation of the Image Information Coding Apparatus]

A description will be given next of the operation of the image information coding apparatus 100 shown in FIG. 6.

A video signal $S_{in}$ fed to the same apparatus 100 is first converted to a digital signal by the A/D converter 101. Next, the frames of the resultant signal are rearranged by the screen rearrangement buffer 102 according to the GOP structure of the image compression information to be output. For the image to be intra-coded, the differential information between the input image and the pixel values generated by the intra-prediction device 115 is fed to the orthogonal transform device 104 for orthogonal transform such as discrete cosine transform and Karhunen-Loeve transform.

The conversion factor from the orthogonal transform device 104 is supplied to the quantization device 105 for quantization. The quantized conversion factor from the quantization device 105 is fed to the reversible coding device 106 where the conversion factor undergoes reversible coding such as variable-length coding and arithmetic coding, after which the conversion factor is stored in the storage buffer 107 and output as image compression information $S_{out}$.

The operation of the quantization device 105 is controlled by the rate control device 117. At the same time, the quantized conversion factor from the quantization device 105 is fed to the inverse quantization device 108 for inverse quantization. Further, the conversion factor is inversely orthogonally transformed by the inverse orthogonal transform device 109 to be restored to the original decoded image information.

The decoded image information which has undergone inverse orthogonal transform is supplied to the deblocking filter 110 for removal of blocking distortion, followed by the storage of the information in the frame memory 111.

The information about intra-prediction mode applied to the blocks and macroblocks in the intra-prediction device 115 is transmitted to the reversible coding device 106 for coding as part of the header information in the image compression information.

For the image to be inter-coded, the image information is fed to the motion prediction/compensation device 116. At the same time, the reference image information is extracted from the frame memory 111 for motion prediction to generate reference image information.

The reference image information is transmitted to the adder 103 for addition to the image information from the screen rearrangement buffer 102, thus converting the reference image information to a differential signal.

The thinning-out device 112 receives the image information stored in the frame memory 111. The same device 112 thins out the information to 1/N (N: positive integer) both in the horizontal and vertical directions and stores the generated pixel values in the frame memory 113.

Further, the motion prediction/compensation device 114 searches for the optimal coarse motion vector information for the block concerned through block matching using the pixel values stored in the frame memory 113 and the image blocks such as 4×4, 8×8 and 16×16 blocks.

In order to field-code a picture, thinning-out is conducted separately for the first and second fields.

The coarse motion vector information searched using a reduced screen is fed to the motion prediction/compensation device 116.

The motion prediction/compensation device 116 performs refinement using the reference screen with the original image resolution. The same device 116 does so by changing the manner in which it accesses the memory according to the search center address in units of a predetermined number of words as appropriate. It should be noted that the manner in which the memory is accessed may be changed in units of a predetermined number of bits rather than words.

In other refinement, on the other hand, the same device 116 divides the search area into at least two parts using the reference screen with the original image resolution, searching all the areas close to the search center and searching those far from the search center in a discrete manner.

Further, the same device 116 simultaneously outputs motion vector information to the reversible coding device 106 where this information undergoes reversible coding such as variable-length coding and arithmetic coding, thus forming image compression information.

Therefore, the image information coding apparatus 100 reduces the number of searches performed as a result of the hierarchical search during access to the searched data in the frame memory, thus contributing to reduced power consumption and reduced number of computations (faster computations) in motion prediction (full resolution).

Further, the image information coding apparatus 100 configured as described above treats all the accessed data areas as the target areas for motion search and changes the manner in which it performs a search according to the distance from the search center to the hierarchical vector, thus providing improved compression efficiency.

In the present invention, the reduced screen generating device adapted to compress a plurality of frame images at a predetermined compression ratio to generate a plurality of reduced screens of lower hierarchical levels corresponds to the thinning-out device 112. The first motion prediction device adapted to search for a first motion vector using the plurality of reduced screens corresponds to the motion prediction/compensation device 114. The second motion prediction device adapted to switch between search areas in the memory in which the frame images are stored to search for a second motion vector using the first motion vector in the switched search area corresponds to the motion prediction/compensation device 116.

The present application contains subject matter related to that disclosed in Japanese Priority Patent Application JP 2009-106245 filed in the Japan Patent Office on Apr. 24, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image information coding method for performing a motion vector search based on hierarchical search in an image compression information device adapted to output image compression information, the image information coding method comprising the steps of:

compressing a plurality of frame images at a predetermined compression ratio to generate a plurality of reduced screens of lower hierarchical levels;

searching for a first motion vector using the plurality of reduced screens;

switching between search areas in a memory in which the frame images are stored; and searching for a second motion vector using the first motion vector in the switched search area, wherein when the search area is not an integer multiple of an access unit, whether access to the access unit is canceled is determined based on a proportion of the search area in the access unit, wherein when the proportion of the search area in the access unit is less than a particular threshold, the access to the access unit is canceled, and when the proportion of the search area in the access unit is greater than the particular threshold, the access to the access unit is not canceled.

2. The image information coding method of claim 1, wherein the search area in the memory is formed with an access unit.

3. The image information coding method of claim 2, wherein the access unit is a predetermined number of bits in length in the memory in which the frame images are stored.

4. The image information coding method of claim 3, wherein the access unit is a word in the memory.

5. The image information coding method of claim 4, wherein in the search for the second motion vector, access to a word is cancelled according to the proportion of a search target in that word.

6. The image information coding method of claim 1, wherein in the search for the second motion vector, a motion search is performed on the accessed frame images of the memory in search area having an arbitrary shape with the number of search computations stored.

7. The image information coding method of claim 6, wherein in the search for the second motion vector in the search area, the concentration of search points is different between inside and outside the area having the arbitrary shape.

8. The image information coding method of claim 7, wherein in the search for the second motion vector in the search area, the search points are more coarse outside the area than inside the area.

9. The image information coding method of claim 1, wherein the reduced screen is divided into blocks of a predetermined number of bits, and the first motion vector is found by using the divided blocks.

10. The image information coding method of claim 9, wherein each of the blocks is made up of N×M pixels, N and M=$2^n$, n: positive integer.

11. An image information coding apparatus for performing a motion vector search based on hierarchical search in an image compression information device adapted to output image compression information, the image information coding apparatus comprising:

a reduced screen generating device adapted to compress a plurality of frame images at a predetermined compression ratio to generate a plurality of reduced screens of lower hierarchical levels;

a first motion prediction device adapted to search for a first motion vector using the plurality of reduced screens; and a second motion prediction device adapted to switch between search areas in the memory in which the frame images are stored to search for a second motion vector using the first motion vector in the switched search area, wherein when the search area is not an integer multiple of an access unit, whether access to the access unit is canceled is determined based on a proportion of the search area the access unit, wherein when the proportion of the search area in the access unit is less than a particular threshold, the access to the access unit is canceled, and when the proportion of the search area in the access unit is greater than the particular threshold, the access to the access unit is not canceled.

12. The image information coding apparatus of claim 11, wherein the access unit is a word in the memory.

13. The image information coding apparatus of claim 12, wherein in the search for the second motion vector, access to a word is cancelled according to the proportion of a search target in that word.

14. The image information coding apparatus of claim 11, wherein in the search for the second motion vector, a motion search is performed on the accessed frame images of the memory in the search area having an arbitrary shape with the number of search computations stored.

15. The image information coding apparatus of claim 14, wherein in the search for the second motion vector in the search area, the concentration of search points is different between inside and outside the area having the arbitrary shape for the first motion vector.

\* \* \* \* \*